(12) United States Patent
Lunz

(10) Patent No.: US 8,696,206 B2
(45) Date of Patent: Apr. 15, 2014

(54) BEARING RING COMPRISING A HYDRAULIC PRELOADING MEANS AND BEARING ASSEMBLY COMPRISING SUCH A BEARING RING

(75) Inventor: Erich Lunz, Lonnerstadt (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/879,699

(22) PCT Filed: Oct. 6, 2011

(86) PCT No.: PCT/EP2011/067426
§ 371 (c)(1),
(2), (4) Date: May 24, 2013

(87) PCT Pub. No.: WO2012/049060
PCT Pub. Date: Apr. 19, 2012

(65) Prior Publication Data
US 2013/0236135 A1    Sep. 12, 2013

(30) Foreign Application Priority Data
Oct. 16, 2010  (DE) .......................... 10 2010 048 728

(51) Int. Cl.
*F16C 23/10*  (2006.01)
*F16C 27/00*  (2006.01)

(52) U.S. Cl.
USPC ........................................... 384/99; 384/563

(58) Field of Classification Search
USPC ............ 384/99, 101, 517, 556.557, 563, 905, 384/556, 557, 535, 581
See application file for complete search history.

(56) References Cited

U.S. PATENT DOCUMENTS

| 4,023,868 | A | * | 5/1977 | Miki ............................. 384/563 |
| 4,915,510 | A | * | 4/1990 | Arvidsson ...................... 384/99 |
| 5,028,152 | A |   | 7/1991 | Hill et al. |
| 5,887,984 | A | * | 3/1999 | Duval .......................... 384/477 |
| 2007/0039187 | A1 | | 2/2007 | Guempel et al. |
| 2007/0217724 | A1 | * | 9/2007 | Verhoeven .................... 384/517 |

FOREIGN PATENT DOCUMENTS

| DE | 9004901 | | 10/1991 |
| DE | 4126317 | | 2/1992 |
| DE | 4332477 | A1 * | 3/1995 |
| DE | 69508203 | | 7/1999 |
| EP | 0210801 | | 2/1987 |
| GB | 1535163 | | 12/1978 |
| JP | 2007177855 | A * | 7/2007 |

* cited by examiner

*Primary Examiner* — Phillip A Johnson
(74) *Attorney, Agent, or Firm* — Volpe and Koenig, P.C.

(57) ABSTRACT

A bearing ring is provided, including a body and an end face (3; 6). The problem of providing a bearing assembly having a space-saving preloading device which can be actuated quickly is solved for this bearing ring by a piston (8; 15) of a fluidic preloading device; the piston being accommodated in the end face (3; 6). A bearing assembly is also provided including a bearing (2) having a bearing ring (1) and a first fluidic preloading device for setting a bearing preload, this preloading device acting on a first end face (3) of the bearing ring (1), and further including a second fluidic preloading device which acts in the opposite direction on a second end face (6) of the bearing ring (1).

6 Claims, 1 Drawing Sheet

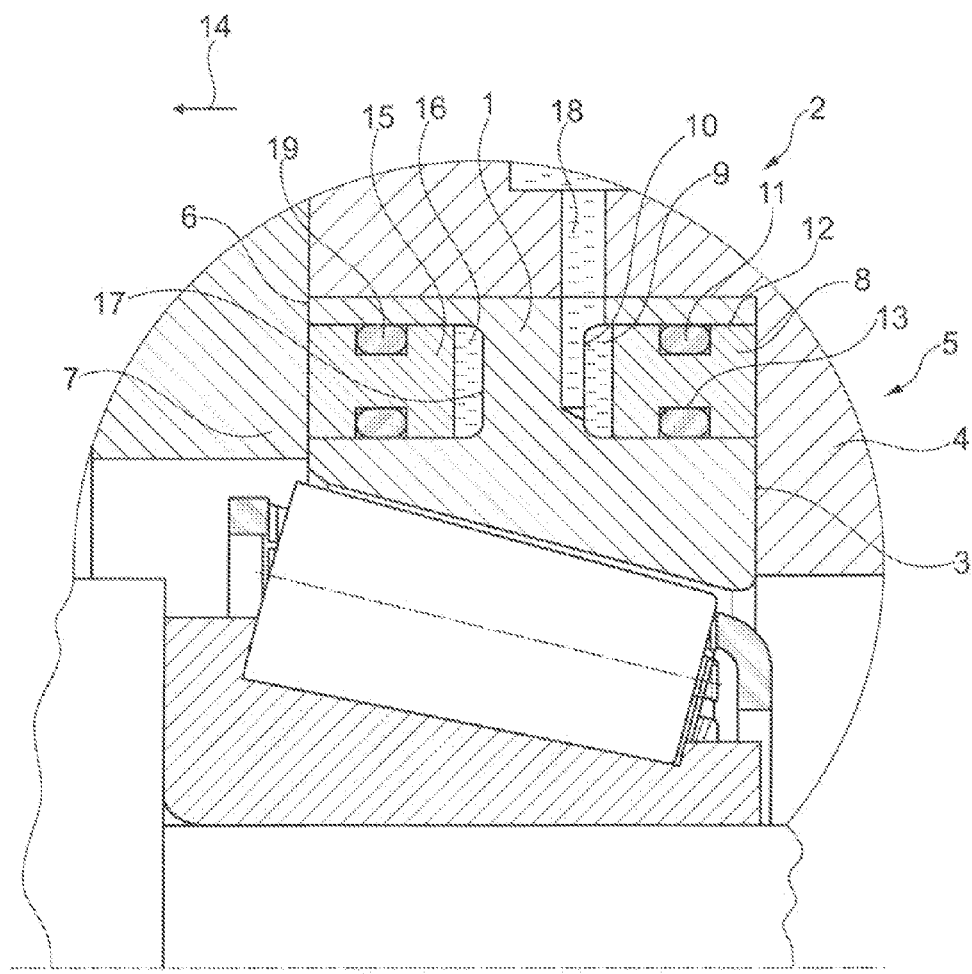

BEARING RING COMPRISING A HYDRAULIC PRELOADING MEANS AND BEARING ASSEMBLY COMPRISING SUCH A BEARING RING

FIELD OF THE INVENTION

The invention relates to a bearing ring and to a bearing assembly.

From the prior art, hydraulically biased bearings are known.

A bearing assembly here comprises a bearing ring with which a fluid, typically hydraulic, biasing device interacts such that a fluid, typically a hydraulic fluid, is provided between the bearing ring and a housing, wherein the fluid is pressurized and a force acts on the end face of the bearing ring adjacent to the fluid space. By activating the biasing device, for example, by increasing the pressure in the fluid, the biasing load can be increased. By reducing the pressure in the fluid, the pressure on the end face of the relevant bearing ring can indeed be lowered, but reducing the biasing load assumes a low force opposite the original biasing direction that occurs during operation, for example, due to a reduction in the friction forces between the bearing ring and the housing and thus is rather delayed in time and difficult to control. A quick, targeted switching between a high and a low biasing load or a switching of the direction in which the biasing load acts is rarely possible.

One possible use case for a quickly switchable biasing load is given, for example, in the pinion shaft bearing of agricultural machines, wherein, for operation in the field, the agricultural machine requires a strongly biased bearing for the case of driving at a high speed but only a lightly biased bearing is required. In this case, a controllable switching of the biasing load of the pinion shaft bearing is useful.

DE 41 26 317 C2 describes a bearing assembly with two bearings spaced apart in the axial direction and a mechanical spring that is arranged between the end faces of respective outer rings as a biasing device. For reducing the biasing load, a hydraulic drive device is provided in which a fluid acts externally on the end face of one of the two bearings not biased by the spring, so that, by actuating the fluid, the biasing load of the two bearings can only be reduced. The bearing assembly consists of at least two bearings, so that it can support springs. In addition, high forces occur.

DE 695 08 203 T2 describes a bearing assembly with a bearing ring and a biasing device that can be actuated hydraulically and comprises a piston-cylinder unit. Here, a channel is provided for the hydraulic fluid and this channel has a bypass of smaller diameter so that an abrupt change in fluid pressure in the bypass causes a high internal resistance and the piston can also be uniformly moved in this case.

EP 0 210 801 A2 describes a bearing assembly with a bearing ring and a piston of a biasing device that can be actuated hydraulically and is arranged outside the bearing ring. The piston acts directly on the end face of one of the two bearings, wherein each bearing has one piston. In this case, the biasing load can indeed be increased selectively, but cannot be selectively decreased on the short term. It is also unfavorable that packaging space for the piston of the biasing device must be provided between the end face of the bearing ring and the housing, which makes seals and a feed line necessary in the housing.

DE 90 04 901 U1 describes a bearing assembly with a bearing ring and a clamping bush that can be actuated hydraulically and acts on the end face of the bearing ring. The clamping bush is arranged outside of the bearing ring and requires a correspondingly large amount of package space in the housing.

SUMMARY

The object of the invention is to provide a bearing assembly with a space-saving biasing device that can be controlled quickly.

This object is met according to the invention by a bearing ring and by a piston that is held in the first end face and is part of a fluid biasing device, especially for a bearing assembly.

If a bearing assembly is provided, comprising a bearing with a bearing ring and a first fluid biasing device that acts on a first end face of the bearing ring for setting a bearing biasing load, such that a second fluid biasing device is provided that acts on a second end face of the bearing ring in an opposite direction, the two biasing devices that can be actuated independently from each other provide the possibility of increasing the biasing load in a first direction by actuating the first biasing device and decreasing the biasing load by actuating the second biasing device in a direction opposite the first direction. In particular, the biasing load can be switched quickly and can be reversed in direction if necessary. The biasing load can be set quickly and can be controlled easily in both directions.

The bearing assembly here advantageously comprises a bearing ring in which a piston of the first biasing device is held in at least one end face, so that the biasing device can be arranged in a space-saving way essentially completely in the body of the bearing ring.

Advantageously it is provided with respect to the bearing ring that a recess is arranged in the first end face and a pressurized fluid of a biasing device is provided between the piston and a recess base. Feed lines for the pressurized fluid are here formed as drilled holes in the body of the bearing ring and open into the recess. In particular, several recesses can be provided with the fluid through a common feed line, so that several pistons exert the same contact pressure.

Advantageously it is provided that the piston closes essentially flush with the section of the surface of the end face of the bearing ring adjacent to the recess. In this case, the bearing ring essentially keeps its standard dimensions and has the same installation space.

Advantageously it is provided that a sealing means is arranged on the piston. The sealing means can be formed as an O-ring that forms a seal between the piston and its guide surface, for example, a wall of the recess.

Advantageously it is provided that a second piston is arranged in a second recess on a second end face of the body. The at least two pistons provided on the two end faces of the body of the bearing ring can belong to two biasing devices that can be actuated independently of each other, so that by actuating the first biasing device with the first piston, the biasing stress is increased in a first direction and by actuating the second biasing device with the second piston, a force is exerted in a second direction opposite the first direction, wherein this force cancels out or decreases the biasing stress set by the first biasing device.

Additional advantages and features are given from the dependent claims and also from the description below of a preferred embodiment of the invention.

BRIEF DESCRIPTION OF THE DRAWING

The invention is described and explained below in more detail with reference to the accompanying drawing.

FIG. 1 shows, in a cut-out view, a partially sectioned, schematic view of an embodiment of a bearing ring according to the invention in an embodiment of a bearing device according to the invention.

DETAILED DESCRIPTION OF THE PREFERRED EMBODIMENTS

FIG. 1 shows a bearing ring 1 constructed as an outer ring for a bearing 2 formed as a roller bearing, in particular, a conical roller bearing that supports a pinion shaft of a drive unit of an agricultural machine not shown in more detail so that it can rotate.

The bearing ring 1 has a body with a first end face 3 that contacts a first section 4 of a housing 5 and with a second end face 6 that contacts a second section 7 of the housing 5. A piston 8 of a first biasing device is arranged in the first end face 3 of the body of the bearing ring 1, wherein the first biasing device acts on the first end face 3 for setting a bearing biasing load.

The piston 8 is arranged recessed in a recess 9 arranged in the first end face 3, wherein a fluid, in particular a hydraulic fluid, of the first biasing device is held between the piston 8 and a recess base 10. The piston 8 is formed as a cylinder, wherein the recess 9 has essentially a rectangular cross section. The piston 8 is held completely in the recess 9 and extends essentially flush to the section of the first end face 3 adjacent to the recess 9.

A sealing means 11 that is formed as an O-ring is arranged on the piston 8, wherein the O-ring forms a seal on a wall 12 of the recess 9 and is held in a peripheral recess 13 on the body of the piston 8. The first biasing device comprises a drilled hole that is arranged in the housing 5 and also passes through the body of the bearing ring 1 in sections and opens into the first recess 9 as a feed line for the hydraulic fluid.

If hydraulic fluid arranged in the recess 9 is pressurized, the piston 8 is pressed against the section 4 of the housing 5 and biases the bearing ring 1 in the direction of the arrow 14.

The bearing ring 1 has a piston 15 of a second biasing device held in the second end face 6. The piston 15 is arranged in another recess 16, wherein a hydraulic fluid of the second biasing device is arranged between the piston 15 and a recess base 17. Like the first piston 8, the second piston 15 has a sealing means 19 that is formed as an O-ring. The second piston 15 extends essentially flush to the surface area section of the second end face 6 adjacent to the second recess 16.

If the second biasing device is actuated, in particular, the pressure increases on the hydraulic fluid located in the second recess 16, the second piston 15 is supported on the second section 7 of the housing 5 and exerts a force that is directed essentially anti-parallel to the direction of the arrow 14 on the bearing ring. By actuating the second biasing device, a biasing load previously set by means of the first biasing device can be increased or decreased, in particular, it is also possible to reverse the direction of the biasing load.

The two biasing devices can be actuated independently from each other, but are controlled by a higher level control regulation unit, so that the biasing load can be set in terms of magnitude and direction and, for example, as a function of the speed of the agricultural vehicle.

In the embodiment described above, the pistons 8, 15 were each formed as cylindrical bodies and the recesses 9, 16 as cylindrical holes. It is understood that the pistons can also be formed as annular pistons surrounding the end faces 3, 6 and the recesses as grooves, especially as annular grooves.

The invention was described above using a conical roller bearing. It is understood that the bearing 1 could also be formed as an angular contact ball bearing.

LIST OF REFERENCE NUMBERS

1 Bearing ring
2 Bearing
3 First end face
4 First section of the housing 5
5 Housing
6 Second end face
7 Second section of the housing 5
8 Piston
9 Recess
10 Recess base
11 Sealing means
12 Walls of the recess 9
13 Receptacle
14 Direction
15 (Second) piston
16 (Second) recess
17 (Second) recess base
18 Drilled hole
19 (Second) sealing means

The invention claimed is:

1. A bearing ring comprising a body having a first end face, and a fluid biasing device formed by a first piston that is held in the first end face, and a second piston is arranged in a recess in a second end face of the body.

2. The bearing ring according to claim 1, wherein a first recess is arranged in the first end face and a pressurized fluid is provided between the first piston and a recess base of the first recess.

3. The bearing ring according to claim 2, wherein the first piston extends essentially flush with a section of a surface area of the first end face adjacent to the first recess.

4. The bearing ring according to claim 1, wherein a seal is arranged on the first piston.

5. A bearing assembly comprising a bearing with a bearing ring, a first fluid biasing device acting on a first end face of the bearing ring for setting a bearing bias, and a second fluid biasing device that acts on a second end face of the bearing ring in an opposite direction, wherein the bearing ring includes a piston that is held in the first end face.

6. The bearing assembly according to claim 5, wherein the bearing ring includes a second piston that is held in the second end face.

\* \* \* \* \*